`US006126152A`

United States Patent [19]
Santos et al.

[11] Patent Number: 6,126,152
[45] Date of Patent: Oct. 3, 2000

[54] VARIABLE RESPONSE PNEUMATIC SUPPORT

[75] Inventors: James P. Santos; Peter J. Santos, both of Stowe, Vt.

[73] Assignee: Synergy Services, Ltd., Stowe, Vt.

[21] Appl. No.: 09/034,085

[22] Filed: Mar. 3, 1998

Related U.S. Application Data

[60] Provisional application No. 60/040,106, Mar. 10, 1997.

[51] Int. Cl.$^7$ ........................................... F16F 5/00
[52] U.S. Cl. .......................................... 267/118; 267/122
[58] Field of Search ..................... 267/122, 123, 267/118, 117; 92/43; 5/655.3

[56] References Cited

U.S. PATENT DOCUMENTS

| | | | |
|---|---|---|---|
| 3,722,875 | 3/1973 | Hasse | 267/122 |
| 3,879,776 | 4/1975 | Solen | 5/665 |
| 3,897,942 | 8/1975 | McNamee | 267/122 |
| 4,280,235 | 7/1981 | Kowal | 5/458 |
| 4,625,933 | 12/1986 | Luciano et al. | 267/122 |
| 4,827,546 | 5/1989 | Cvetkovic | 5/455 |
| 5,060,328 | 10/1991 | Larson | 5/450 |
| 5,159,725 | 11/1992 | Larson | 5/451 |
| 5,253,377 | 10/1993 | Larson | 267/122 |
| 5,335,380 | 8/1994 | Larson | 5/255 |
| 5,558,398 | 9/1996 | Santos | 297/284.3 |
| 5,619,764 | 4/1997 | Lopau | 5/713 |

FOREIGN PATENT DOCUMENTS 405306727  11/1993  Japan  ..................................... 267/122

*Primary Examiner*—Robert J. Oberleitner
*Assistant Examiner*—Pamela J. Lipka
*Attorney, Agent, or Firm*—Michael J. Weins; Jeffrey E. Semprebon

[57] ABSTRACT

A pneumatic resiliency unit having a bellows with a bellows first section terminating in a bellows first section first end and a bellows first section second end, and a bellows second section terminating in a bellows second section first end and a bellows second section second end. A support surface engages the bellows first section first end and a backing plate is spaced apart from the support surface. An intermediate support platform is positioned a separation S from the backing plate and attaches to the bellows first section second end and to the bellows second section first end. The bellows second section second end is engageable with the backing plate, and spaced apart therefrom when the support surface is load free. The separation S is preferably variable to change the response of the pneumatic resiliency unit to a load applied to the support surface. Further variation in the response is provided by altering the shape of the bellows or by restricting air flow between the bellows sections. The bellows can form a closed system or an open system. Multiple pneumatic resiliency units may be combined to form an extended compliant pneumatic support surface.

23 Claims, 7 Drawing Sheets

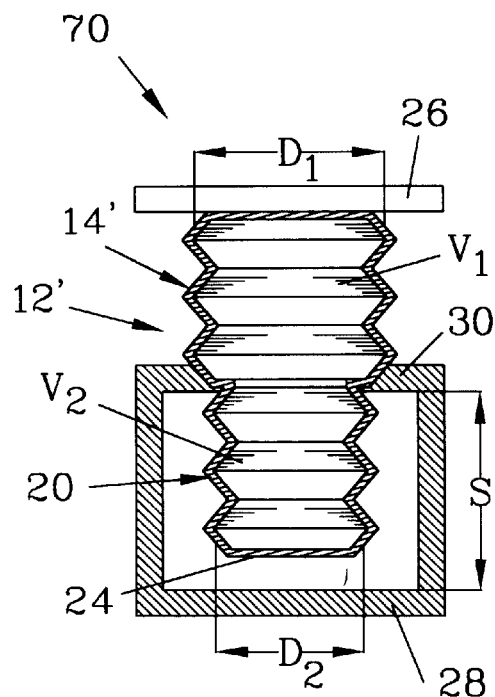
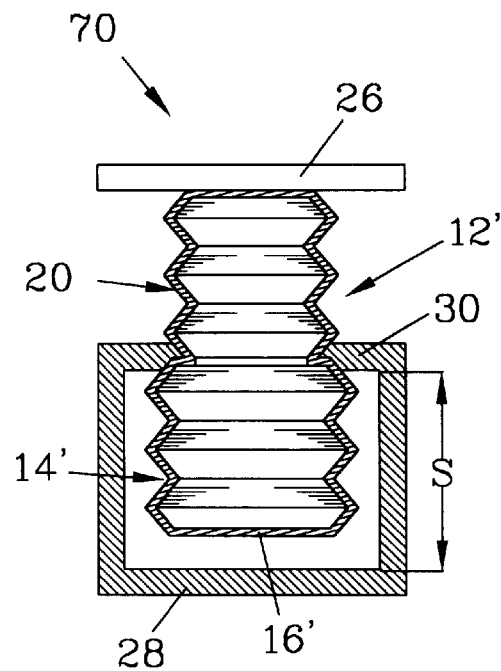
Figure 7
Figure 8
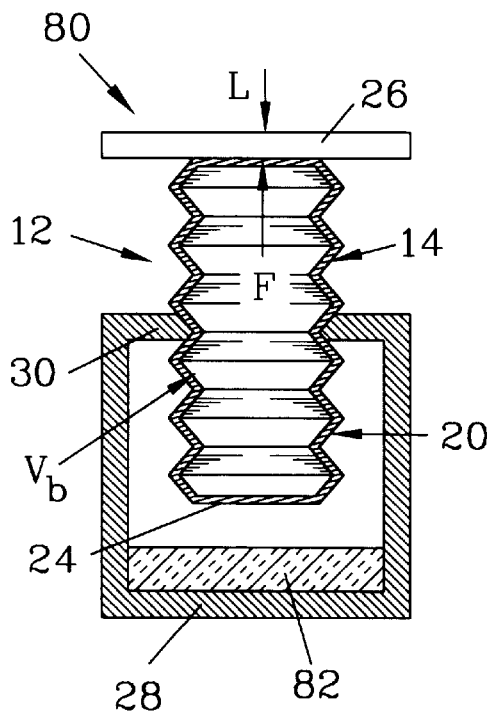
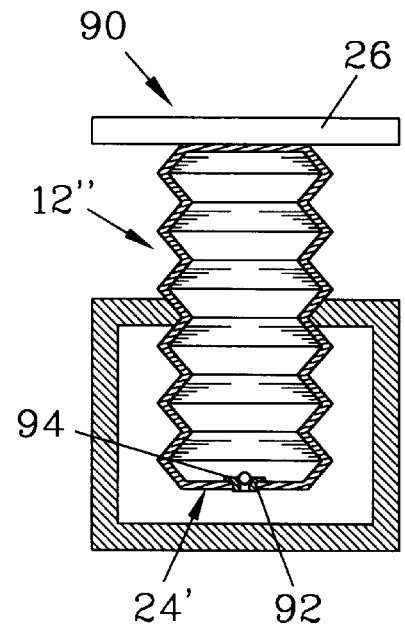
Figure 9
Figure 10

6,126,152

VARIABLE RESPONSE PNEUMATIC SUPPORT

This application claims priority of provisional application No. 60/040,106, filed Mar. 10, 1997, now abandoned.

FIELD OF THE INVENTION

The present invention relates to a variable response support and more particularly to a pneumatic support which has utility in the construction of seats, couches, and beds.

BACKGROUND OF THE INVENTION

There have been a variety of prior art mattresses and other support surfaces which have employed fluids such as water or air to provide a resilient surface. One of the problems with such support surfaces is dampening the flow of the fluid as the load residing on the support surface shifts. A second problem results from the tendency of such support structures to drastically deform, causing the load to bottom out or vacillate in response to a heavy load which is rapidly applied.

The former problem associated with dampening has been in part overcome by the use of fluid-dampening inserts such as taught in U.S. Pat. No. 4,280,235. The latter problem of bottoming out or vacillating in response to a rapidly applied heavy load has been in part overcome by the use of paired fluid chambers such as taught in U.S. Pat. No. 3,722,875.

The problem of local deformation in mattresses can be a particular problem in beds, since the deformation of the edge of the bed can result in a bed where it is difficult to get off the mattress and out of bed. This problem has in part been overcome by the teaching of U.S. Pat. No. 4,827,546, which teaches employing a series of interconnected fluid containing bellows in combination with a network of springs to provide a composite support structure.

Another approach to providing a variable character mattress is taught in U.S. Pat. Nos. 5,060,328; 5,159,725; and 5,335,380. These patents teach the use of bellows to provide a spring insert in water beds to change the support characteristics in selected regions. The teaching of these patents is limited to the use of water as the fluid, and the bellows employ restriction of the fluid outflow from the bellows to provide resistance to loads. In one embodiment, stacked bellows are employed, and adjusting the restriction of flow between the stacked bellows provides limited ability to adjust the resistance. Adjustment of the device by the user appears to be difficult, and it is unclear from these patents whether such adjustment is in fact practical.

None of these devices provide a support surface which is capable of providing a resilient response to loads where the stiffness of the response has a dual character as a function of displacement, having an initial soft response to displacement and a subsequent stiffer response to provide proper biomechanical support. Additionally, these surfaces are either not adjustable or adjustable to only a limited degree with respect to the characteristic of the resistant force that can be generated.

Thus there is a need for a support surface which can provide a two-staged resilient response of the surface to an applied load, and there is a need for a support surface where the character of the response can be readily adjusted.

SUMMARY OF THE INVENTION

The present invention provides a pneumatic resiliency unit which has particular utility for use in seating systems, back supports, mattresses, and other related body supporting systems. In a preferred embodiment, an array of such resiliency units are combined to create such a body support system.

The pneumatic resiliency unit has a bellows, which in turn has a bellows first section terminating in a bellows first section first end and a bellows first section second end. Similarly, the bellows also has a bellows second section which terminates in a bellows second section first end and a bellows second section second end.

Either the bellows first section, the bellows second section, or both bellows sections can be constructed with a single lobe or, alternatively, can employ multiple lobes. When multiple lobes are employed, a lobe manifold is provided which communicates between the lobes of each section so that the lobes act in concert.

A support surface which resiliently supports a load applied thereto is provided. The support surface engages the bellows first section first end and a backing plate is spaced apart from the support surface. Interposed between the support surface and the backing plate is an intermediate support platform which is positioned a separation S from the backing plate. The intermediate support platform attaches to the bellows first section second end and to the bellows second section first end. The bellows second section second end forms a free surface which is engageable with the backing plate. It is preferred that the bellows second section second end be spaced apart from the backing plate by a separation distance d when the support surface is load free. When one or both of the bellows sections employs multiple lobes, it is preferred that the lobe manifold be made an integral part of the intermediate support platform.

Preferably, means for varying the separation S between the intermediate support platform and the backing plate are provided. These means can be either mechanical or pneumatic, and serve to change the separation distance d, thereby changing the response of the pneumatic resiliency unit to a load applied to the support surface.

When the separation S is set such that the bellows second section second end is at all times in contact with the backing plate, a load L applied to the support surface compresses the bellows, providing a stiff response to any motion of the support surface towards the backing plate. The bellows provides a reaction force F to the applied load L which is dependent on both the elasticity of the bellows and the compressibility of the gas contained therein. The reaction force F increases rapidly as the support surface is advanced toward the backing plate. When the bellows is a closed system such that the mass of air contained in the bellows remains constant, the pressure increase in the bellows is nearly inversely proportional to the decrease in volume of the bellows.

In a preferred mode of operation, the separation S is such that the bellows second section second end is not in contact with the backing plate when the support surface is unloaded. In this mode of operation, when the bellows is a closed system, there exists a two-stage response to the load L applied to the support surface. The initial response is a relatively soft response, since application of the load L initially compresses the bellows first section while the bellows second section expands, thus the reaction force F is initially largely dependent on the elastic properties of the bellows, which results in the reaction force F initially being an essentially linear function of the displacement of the support surface. Such soft response continues until such time as the bellows second section second end engages the backing plate. When the bellows second section second end engages the backing plate, the bellows provides a relatively stiff response to resist further motion of the support surface, in the manner discussed above. This two-stage effective spring constant provides a benefit in that it allows the bellows to quickly provide a relatively low reaction force to a deforming force, and then to more gradually compensate to the deforming force with an increasingly greater reaction force in response to further deformation. This type of response provides particular benefit in support structures such as seats and mattresses, since it provides a firm support for the load bearing points of the skeletal system of the user while providing a softer support for the soft tissue of the user. Thus the pneumatic resiliency unit can provide correct biomechanical support for the body of the user.

To provide a smooth transition between the initial soft response and the subsequent stiffer response, it is further preferred for the backing plate to be provided with a compressible material for engagement with the bellows second section second end to further modify the resulting response characteristics. Alternatively, the backing plate can be resiliently mounted with respect to a fixed backing surface which is affixed with respect to the intermediate support platform.

In addition to the adjustment of the separation S between the backing plate and intermediate support platform, additional variation in the response of the pneumatic resiliency unit to loads can be provided by altering the shape of the bellows which is employed. Particularly, providing the bellows first section and the bellows second section with differing volumes per unit length adjusts the amount of deformation of the support surface required to cause transition between the softer response and the stiffer response.

Further variation in the response of the pneumatic resiliency unit can be obtained by employing means for restricting the flow between the bellows first section and the bellows second section. Such means can be provided by a throttling orifice between the bellows first section and the bellows second section. The means for restricting the flow between the bellows first section and the bellows second section dampens the initial compression of the bellows first section and any expansion of the bellows second section. This dampening provides a speed-dependent initial response of the bellows, due to the restriction of air flow between the bellows first section to the bellows second section. A load which compresses the bellows first section rapidly may decrease the volume of the bellows first section faster than the air can flow through the throttling orifice, thus increasing the pressure of the air in the bellows first section over the pressure in the bellows second section and providing a time-dependant deformation of the support surface.

The bellows employed in the variable response pneumatic resiliency unit can form a closed system or an open system. When the bellows forms a closed system, the mass of air contained in the system is constant.

Alternatively, the bellows can form an open system where air either enters or leaves the bellows. The bellows may form an open system by design when it is desirable to change the response as a function of time or as a result of the loading condition of the support surface. It is also possible to have an open system which results from leakage resulting from inadequate sealing or from permeability of the bellows material.

Whenever an open system is employed, means for providing controlled ingress and egress of air are provided. Preferably, the means for providing controlled ingress and egress are provided by at least one valve, which can be either a one-way valve which allows ingress of air but not egress, or can be a two-way valve which allows both ingress and egress of air. Preferably, the at least one valve is positioned in either the bellows first section first end or in the bellows second section second end. When so positioned, the at least one valve freely communicates with the air outside the pneumatic resiliency unit. It is further preferred that the at least one valve reside in the bellows second section second end.

When the only function of the at least one valve is to compensate for air loss through leakage or permeability, it is preferred for the at least one valve to be a one-way valve which allows for flow of air into the pneumatic resiliency unit. One such type of one-way valve is a ball check valve.

When it is further preferred to provide the ability to change the response to loads as a function of time or as a result of the loading conditions, it is preferred for the at least one valve to be a two-way valve which has set points for the release and intake of air. The set points can be activated by position, pressure, or a combination thereof. Such could be provided by a combination duckbill valve which slides between a closed and open position with respect to egress of air, or could be provided by an orifice configured to sealably engage either the support surface or the backing plate.

While it is possible to design a pneumatic resiliency unit with a characteristic response to load by employing a combination of means for restricting air flow between the bellows sections and means for providing controlled ingress and egress of air, such cannot be readily adjusted to change its response as the loading cycle is changed. Once the desired means for restricting air flow between the bellows sections and/or means for providing controlled ingress and egress of air have been incorporated into the pneumatic resiliency unit, the most convenient method for changing the response is by adjusting the separation S maintained between the intermediate support plate and the backing plate as discussed above.

When the pneumatic resiliency unit is employed in seats, lounges, couches, and beds which are intended to comfortably support the body of a user, it is preferred that multiple pneumatic resiliency units be employed to allow the support surface to more readily conform to the shape of the user's body. The pneumatic resiliency units are preferably combined by connecting the support surfaces of each pneumatic resiliency unit to form an extended support surface. Similarly, the backing plates of each pneumatic resiliency unit are connected to form an extended backing plate. It is further preferred that the intermediate support platforms of each pneumatic resiliency unit be connected to form an extended intermediate support platform. The support surface is preferably fabricated from a compliant material which effectively integrates the deformation between the bellows.

When multiple pneumatic resiliency units are employed to form a compliant variable response pneumatic support surface, it is further preferred that the height-to-diameter ratio of the bellows sections be not greater than about 3:1. It is still further preferred for a semi-compliant spacer net to be provided which engages the bellows first section first ends to maintain them in parallel relationship with respect to each other.

In one preferred embodiment of the compliant variable response pneumatic support surface, a bellows manifold is provided to allow the pressure to equilibrate between the multiple bellows. The bellows manifold equalizes the pressure exerted in the individual bellows. Preferably, the bellows manifold is provided in the extended intermediate support platform.

BRIEF DESCRIPTION OF THE FIGURES

FIGS. 7 and 8 illustrate an embodiment of the present invention where an effective change in separation is obtained by employing reversible non-symmetric bellows.

FIG. 9 is a schematic representation of another embodiment of a variable response pneumatic resiliency unit of the present invention, which provides a transitional response between the initial soft response and the subsequent stiff response of the bellows. A pad of a compliant material is interposed between the bellows second section second end and the backing plate.

FIG. 10 is a schematic representation of another embodiment of a variable response pneumatic resiliency unit of the present invention. In this embodiment, the bellows has an opening and forms an open system. A one-way check valve is provided in the opening of the bellows for compensating for air loss through leakage or permeability of the bellows.

BEST MODE OF CARRYING THE INVENTION INTO PRACTICE

Figure 1:
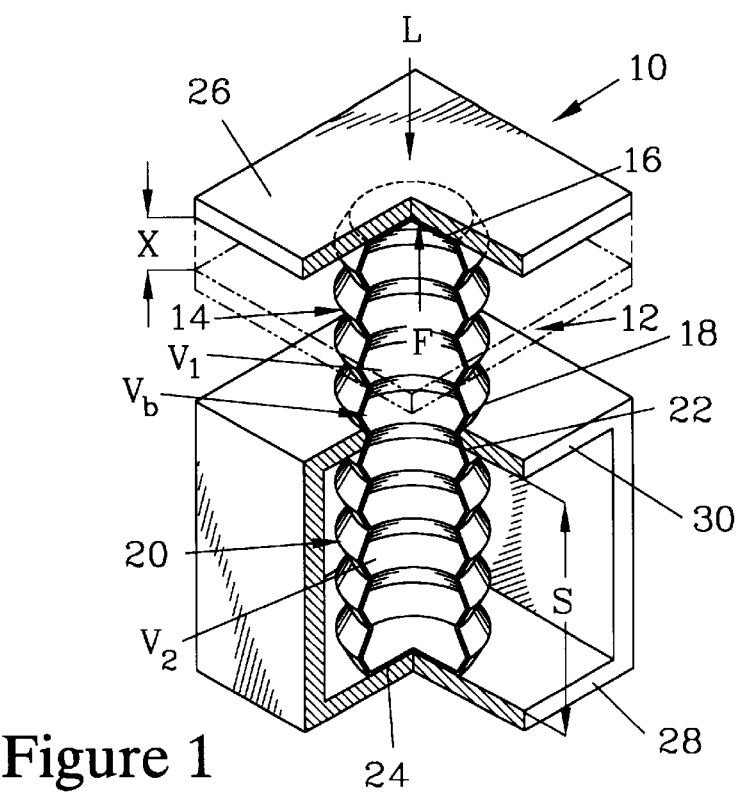
FIG. 1 is a schematic representation of one embodiment of a variable response pneumatic resiliency unit of the present invention. The variable response pneumatic resiliency unit has a bellows having a bellows first section terminating in a bellows first section first end and a bellows first section second end, as well as a bellows second section terminating in a bellows second section first end and a bellows second section second end. A support surface is attached to the bellows first section first end and is spaced apart from a backing plate. An intermediate support platform is positioned between the support surface and the backing plate and is spaced apart from the backing plate by a separation S. The intermediate support platform is attached to the bellows first section second end and to the bellows second section first end. In the view of FIG. 1, the intermediate support platform is separated from the backing plate by a separation S which is sufficiently small that the bellows second section second end engages the backing plate when the support surface is load free and the pneumatic resiliency unit provides a single mode response to a load applied to the support surface.

FIG. 1 illustrates a variable response pneumatic resiliency unit 10 of the present invention. The pneumatic resiliency unit 10 has an air filled bellows 12 which has a variable volume $V_b$. The bellows 12 in this embodiment is sealed, thus forming a closed system where the mass of air in the bellows 12 remains constant. The variable volume $V_b$ changes as the bellows 12 expands and contracts. The bellows 12 has a bellows first section 14 which terminates in a bellows first section first end 16 and a bellows first section second end 18. The bellows first section 14 defines a first volume $V_1$ which makes up a portion of the volume $V_b$. The bellows 12 also has a bellows second section 20 which terminates in a bellows second section first end 22 and a bellows second section second end 24. The bellows second section 20 defines a second volume $V_2$ which makes up the remaining portion of the volume $V_b$.

A support surface 26 for supporting loads engages the bellows first section first end 16. A backing plate 28 is spaced apart from the support surface 26. An intermediate support platform 30 is spaced apart from the backing plate 28 by a separation S. The intermediate support platform 30 is coupled to the bellows first section second end 18 and to the bellows second section first end 22. The benefits resulting from the incorporation of the intermediate support platform 30 can be appreciated by showing examples of how its position can affect the response of the bellows 12 to a load L applied to the support surface 26.

With the intermediate support platform 30 positioned as illustrated in FIG. 1, the separation S is set such that when the support surface 26 is in an unloaded state, the bellows second section second end 24 is in contact with the backing plate 28. When the separation S is so set, application of the load L to the support surface 26 results in movement of the support surface 26 toward the backing plate 28, which decreases the volume $V_b$ of the bellows 12. This decrease in volume $V_b$ of the bellows 12 compresses the air contained therein, resulting in an increase in the pressure of the air contained in the volume $V_b$ which is inversely proportional to the change in the volume $V_b$. This pressure increase, in combination with the elastic forces resulting from deformation of the bellows 12, provides a reaction force F which rises rapidly as the support surface 26 is advanced toward the backing plate 28.

Figure 2:
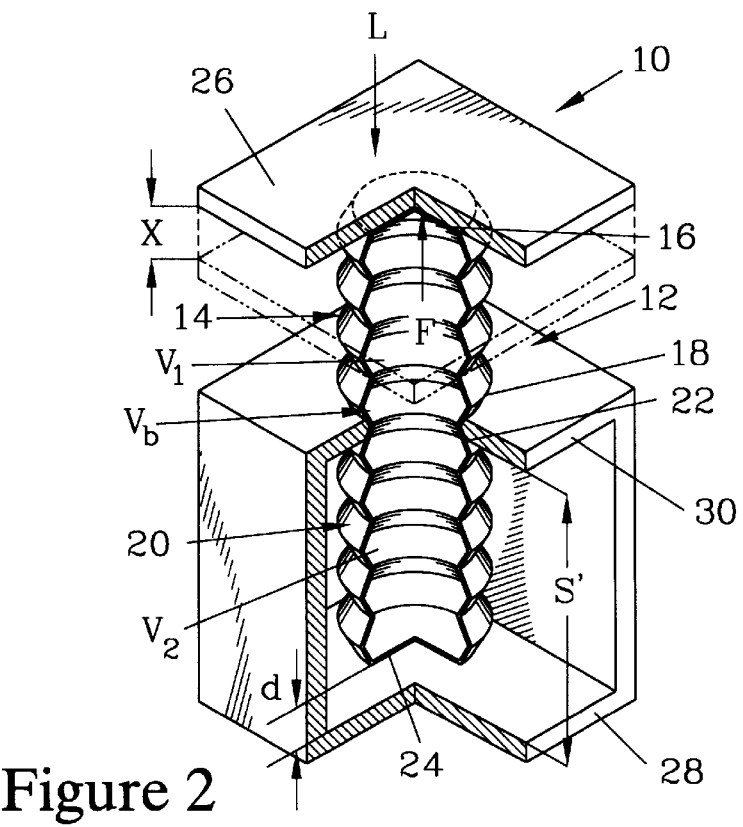
FIG. 2 is a schematic representation of the embodiment shown in FIG. 1 where the intermediate support platform is separated from the backing plate by a separation S' such that the bellows second section second end is spaced apart from the backing plate by a distance d when the support surface is load free. This difference in the relative position of the bellows second section second end results in a bi-modal response to an applied load.

FIG. 2 illustrates the variable response pneumatic resiliency unit 10 where the intermediate support platform 30 is positioned so as to be spaced apart from the backing plate 28 by a separation S' which is somewhat greater than S. The separation S' between the intermediate support platform 30 and the backing plate 28 is such that the bellows second section second end 24 is spaced apart from backing plate 28 by a distance d when the support surface 26 is in the unloaded state. As discussed below, such configuration provides a two-stage resistance to loads applied to the support surface 26. It should be noted that a similar distance d would result if the separation S' were maintained the same as the separation S, but the length of the bellows second section 20 were reduced.

Figure 3:
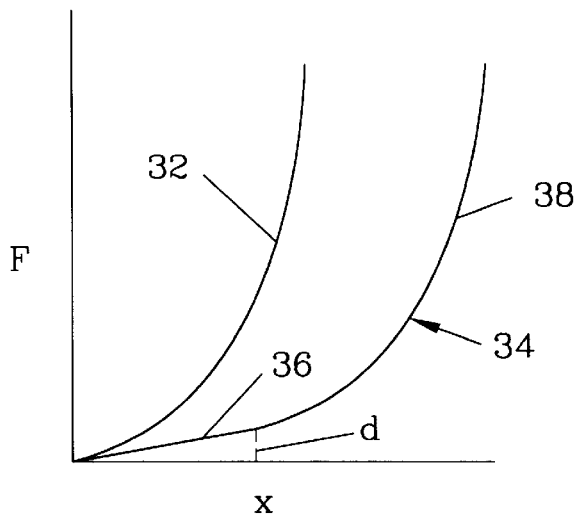
FIG. 3 is a graphical illustration of reaction force F versus displacement x for the pneumatic resiliency unit illustrated in FIGS. 1 and 2.

FIG. 3 graphically illustrates the reaction force F which results as a function of the displacement x of the support surface 26 for both the separation S of FIG. 1 and the separation S' of FIG. 2. When the intermediate support platform 30 is positioned as illustrated in FIG. 1, the increase of the reaction force F as x increases under these conditions is represented by the curve 32, which is nearly inversely proportional to the change in the volume $V_b$ of the bellows 12.

When the separation is changed to S', this subtle change in geometry provides the bellows 12 with a two-stage response to the displacement x of the support surface 26, as is illustrated by curve 34 of FIG. 3. With the separation S' the character of the curve 34 has two branches, the first being a lower branch 36 which is quasi-linear. The lower branch 36 shows the initial reaction force F as the displacement x increases before the bellows second section second end 24 contacts the backing plate 28. Under such conditions, the major component of the force F is provided by the elastic deformation of the bellows 12 as the first volume $V_1$ of the bellows first section 14 decreases, and the change in the first volume $V_1$ is compensated by an increase in the second volume $V_2$ of the bellows second section 20. The elastic deformation of the bellows 12 typically provides a relatively low reaction force F, which results in a soft response to loads. As the support surface 26 is increasingly displaced, expansion of the bellows second section 20 causes the bellows second section second end 24 to be increasingly advanced towards the backing plate 28.

The force F changes character and shifts to an upper branch 38 as the bellows second section second end 24 engages the backing plate 28. When the bellows second section second end 24 engages the backing plate 28, the second volume $V_2$ of the bellows second section 20 can no longer expand to compensate for decrease in the first volume $V_1$ of the bellows first section 14. Thus, the total volume $V_b$ of the bellows 12 decreases as the load L applied to the support surface 26 is increased. Further movement of the support surface 26 toward the backing plate 28 increases the pressure of the gas contained in the volume $V_b$, which again causes the bellows 12 to respond with a reaction force F which rises rapidly, since the pressure increase is again inversely proportional to the change in the volume $V_b$. This rapidly increasing reaction force F provides a relatively stiff response to loading of the support surface 26.

The two-staged response of the bellows 12 may be adjusted by varying the separation S between the intermediate support platform 30 and the backing plate 28. The separation S determines the distance d between the bellows second section second end 24 and the backing plate 28, and thus determines how much displacement of the support surface 26 is required to cause the transition from the initial soft response to the subsequent stiff response. To allow the user to adjust the response as desired, it is preferred to provide the pneumatic resiliency unit 10 with means for varying the separation S.

Figure 4:
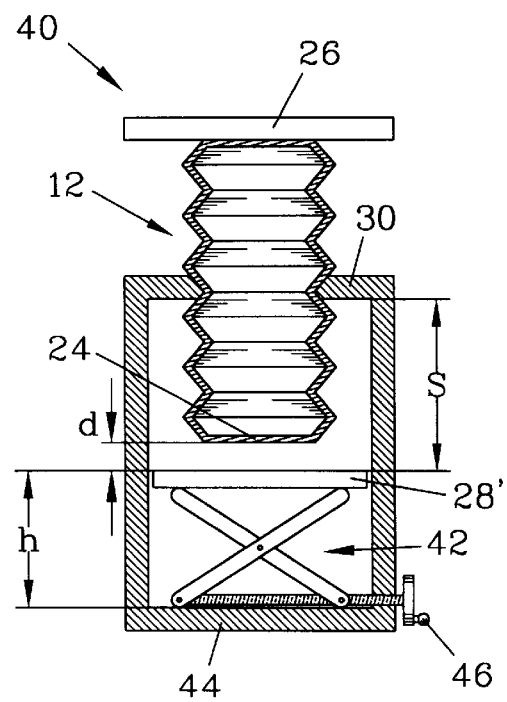
FIG. 4 is a schematic representation of an embodiment of an adjustable variable response pneumatic resiliency unit of the present invention. The ability to adjust the variable response pneumatic resiliency unit is provided by means for varying the separation S between the intermediate support platform and the backing plate. In this embodiment, the backing plate is supported on a jack, the base of which is fixed with respect to the intermediate support platform. The jack allows the separation S between the intermediate support platform and the backing plate to be adjusted.

FIG. 4 illustrates a pneumatic resiliency unit 40 which includes one means for altering the separation S between the intermediate support platform 30 and the backing plate 28'. In this embodiment, the backing plate 28' is not affixed with respect to the intermediate support platform 30, but rather is supported on a jack 42. The jack 42 in turn rests on a base plate 44 which is fixed with respect to the intermediate support platform 30. The jack 42 is operated by a knob 46 to raise or lower the backing plate 28' to a height h above the base plate 44. Since the base plate 44 is fixed with respect to the intermediate support platform 30, increasing or decreasing the height h respectively decreases or increases the separation S between the intermediate support platform 30 and the backing plate 28', which in turn respectively decreases or increases the distance d between the bellows second section second end 24 and the backing plate 28'. While the jack 42 illustrated is a scissor-type jack, it should be appreciated that screw, hydraulic, or other types of jacks known in the art could be substituted.

Figure 5:
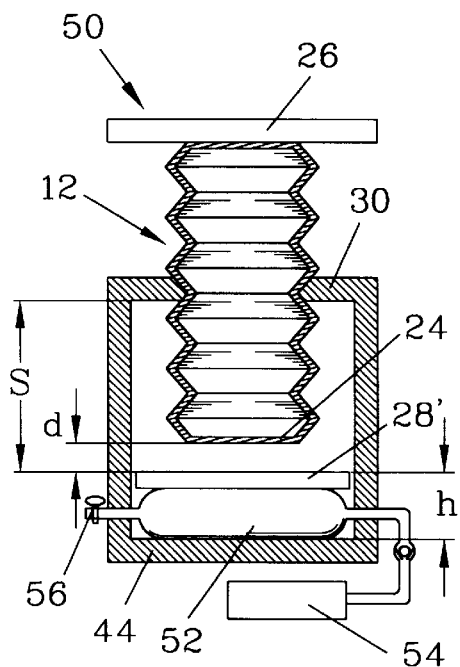
FIG. 5 is a schematic representation of another embodiment of an adjustable variable response pneumatic resiliency unit of the present invention which provides variable separation between the intermediate support plate and the backing plate. In this embodiment, an inflatable bladder is employed to advance the backing plate towards the intermediate support platform. This structure provides a transition in the response between the response when the bellows second section second end does not engage the backing plate and when the bellows second section second end engages the backing plate.

FIG. 5 illustrates an adjustable variable response pneumatic resiliency unit 50 which again provides adjustment of the separation S between the intermediate support platform 30 and the backing plate 28'. In this embodiment, the backing plate 28' is supported on an inflatable bladder 52, which in turn rests on the base plate 44. Bladder inflating means are provided by a pump 54 which communicates with the bladder 52. The pump 54 may be activated to inflate the bladder 52, increasing its volume and increasing the height h of the backing plate 28' above the base plate 44. Similarly, bladder bleed means are provided by a bleed valve 56, which may be activated to allow deflation of the bladder 52, decreasing its volume and decreasing the height h of the backing plate 28'.

It should be pointed out that in certain applications, it may be desirable to eliminate the backing plate 28', in which case the bellows second section second end 24 will be directly engagable with the bladder 52. In such applications, the bladder 52 serves the function of a backing plate.

The response of this structure when the bellows second section second end 24 is engaged with the backing plate 28' depends on the compressive characteristics of the bladder 52, since increasing displacement of the support surface 26 acts on both the air in the bellows 12 and the fluid in the bladder 52. If the bladder 52 is non-elastic and filled with a non-compressible fluid, the response is similar to that of the pneumatic resiliency unit 40 shown in FIG. 4. If the bladder 52 is filled with a compressible fluid, both the air in the bellows 12 and the fluid in the bladder 52 are compressed by further displacement of the support surface 26, and the reaction force F is dependent on the decrease in volume of both the bellows 12 and the bladder 52. If the bladder 52 is elastic, the response is dependent in part on the elastic nature of the bladder 52, since such elastic nature may allow limited further expansion of the bellows second section second end 24 in response to displacement of the support surface 26 when the bellows second section second end 24 is engaged with the backing plate 28'.

Figure 6:
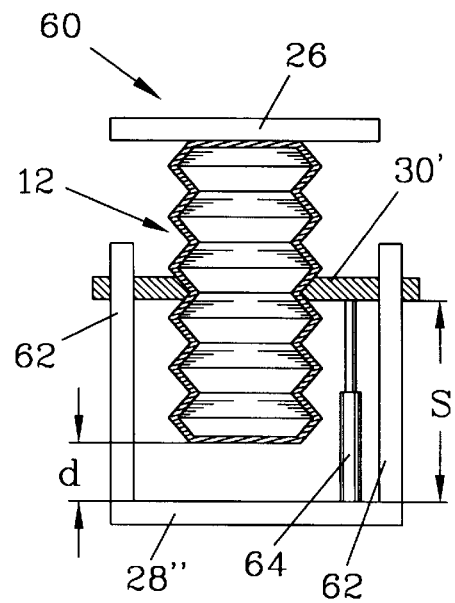
FIG. 6 is a schematic representation of another embodiment of an adjustable variable response pneumatic resiliency unit of the present invention which again provides variable separation between the intermediate support plate and the backing plate. In this embodiment, the variable separation is provided by slidably engaging the intermediate support platform with guide rails attached to the backing plate, and a linear activator is employed to vary the separation between the backing plate and the intermediate support platform.

FIG. 6 illustrates another embodiment of the present invention, an adjustable variable response pneumatic resiliency unit 60 which again provides a variable separation S between the intermediate support plate 30' and the backing plate 28". In this embodiment, guide rails 62 are affixed to the backing plate 28". The intermediate support platform 30' slidably engages the guide rails 62, and a linear activator 64 is connected between the intermediate support platform 30' and the backing plate 28". The linear activator 64 may be activated to vary the separation S between the intermediate support platform 30' and the backing plate 28". While the variation in the separation S allows adjusting the response on the bellows 12 in the same manner as with the pneumatic resiliency unit 40 discussed above, in the pneumatic resiliency unit 60, adjustment of the separation S also results in adjustment of the unloaded position of the support platform 26, since this position is determined by the position of the intermediate support platform 30'.

FIG. 7 illustrates another embodiment of the present invention, a variable response pneumatic resiliency unit 70 where an effective change in separation may be obtained by employing a reversible non-symmetric bellows 12'. Other than the bellows 12', the structure of the pneumatic resiliency unit 70 is identical to that of the pneumatic resiliency unit 10 shown in FIGS. 1 and 2.

The bellows 12' is constructed such that the bellows first section 14' has a volume per unit length which is greater than that of the bellows second section 20. In the pneumatic resiliency unit 70, this is achieved by constructing the bellows first section 14' with a diameter $D_1$ which is greater than a diameter $D_2$ of the bellows second section 20. When the volume per unit length of the bellows first section 14' is greater than the volume per unit length of the bellows second section 20, a relatively small amount of displacement of the support surface 26 results in a large decrease in the first volume $V_1$. As the second volume $V_2$ increases to compensate for decrease in the first volume $V_1$, the increase in the second volume $V_2$ results in a large displacement of the bellows second section second end 24 towards the backing plate 28. This effectively causes the transition between the initial soft response and the subsequent stiff response to occur with less displacement of the support surface 26, which is similar in effect to reducing the separation S between the intermediate support platform 30 and the backing plate 28.

FIG. 8 shows the pneumatic resiliency unit 70 illustrated in FIG. 7 in an alternative configuration. In FIG. 8, the bellows 12' is mounted in an inverted position, such that the bellows first section 14' serves the function of a bellows second section, and the bellows second section 20 serves the function of a bellows first section. In this configuration, since the volume per unit length of the bellows second section 20 is less than the volume per unit length of the bellows first section 14', a relatively large amount of displacement of the support surface 26 results in a smaller advancement of the bellows first section first end 16' (which serves the function of a bellows second section second end) towards the backing plate 28. This effectively requires a greater displacement of the support surface 26 to cause the transition between the initial soft response and the subsequent stiff response to occur, and is similar in effect to increasing the separation S between the intermediate support platform 30 and the backing plate 28.

FIG. 9 illustrates a variable response pneumatic resiliency unit 80 which provides a transitional response between the initial soft response and the subsequent stiff response of the bellows 12. The pneumatic resiliency unit 80 is structurally similar to the pneumatic resiliency unit 10 discussed above, and differs only in that a pad 82 of a compliant material is affixed to the backing plate 28. In this embodiment, as the support surface 26 is increasingly displaced, the initial response is again a soft response due to the elastic deformation of the bellows 12 as the bellows first section 14 is compressed and the bellows second section 20 expands, advancing the bellows second section second end 24 towards the pad 82 and backing plate 28. When the bellows second section second end 24 engages the pad 82, the pad 82 is compressed by further advancement of the bellows second section second end 24. The resistance to such compression causes the volume $V_b$ of the bellows 12 to be decreased, with an increase in air pressure. Thus, the reaction force F is partially dependent on the compressibility of the pad 82, forming an intermediate response to loading of the support surface 26. As the support surface 26 is further displaced, the pad 82 reaches its limit of compressibility. Further displacement of the support surface 26 results in inversely proportionate increase in pressure, thus providing the subsequent stiff response to such displacement.

In all the embodiments discussed above, the bellows are sealed, thus forming a closed system where the mass of air contained in the bellows is constant. Alternatively, the bellows may be provided with means for controlling ingress and egress of air, thus forming an open system.

FIG. 10 illustrates a variable response pneumatic resiliency unit 90 of the present invention which employs a bellows 12" having an opening 92. In this embodiment, the opening 92 is located in the bellows second section second end 24'. Typically, when the bellows 12" is constructed by blow-molding a polymeric material, an opening such as the opening 92 is required to accommodate the nozzle for injecting pressurized air which expands the polymeric material against the mold. The opening 92 may be plugged, to form a closed system such as those discussed above, but it is preferred for the opening 92 to be provided with means for controlling ingress and egress of air to and from the bellows 12". In the pneumatic resiliency unit 90, the means for controlling ingress and egress of air is provided by a one-way check valve 94. The check valve 94 allows ingress of air into the bellows, but does not allow egress of air. The check valve 94 allows compensation for any air loss due to leakage or permeability of the bellows 12". The forces compressing the bellows 12" when a load is applied to the support surface 26 are typically much greater than the elastic forces causing the bellows 12" to expand when such load is removed. If there is leakage or if the bellows 12" are of a permeable material, this disparity in force results in a net loss of air after prolonged use. The check valve 94 allows air to readily enter the bellows 12" when a load is removed from the support surface 26. When unloaded, the bellows 12" will tend to expand to its original length, creating a slight vacuum in the bellows 12" if air has been lost. This vacuum is sufficient to cause air to flow through the check valve 94, thus compensating for any air loss.

Figure 11:
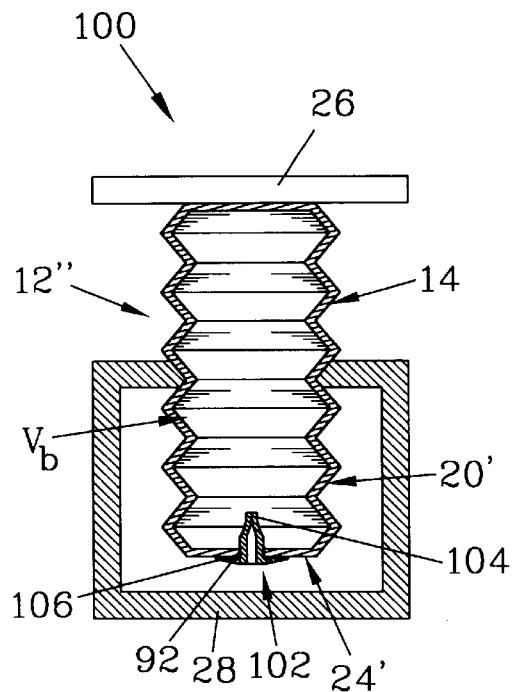
FIG. 11 is a schematic representation of another embodiment of a variable response pneumatic resiliency unit of the present invention which includes a two-way valve, which has a trigger point pressure differential for allowing air to exit from the bellows and a set point shut-off. The valve also has a minimal trigger point for allowing air to enter the bellows.

FIG. 11 illustrates a variable response pneumatic resiliency unit 100 which again forms an open system. In this embodiment, the opening 92 in the bellows 12" is fitted with a two-way valve 102. The two-way valve 102 is a commercially available component which includes both a check valve 104 for allowing ingress of air, and a pressure relief valve 106 for allowing egress of air. The check valve 104 shown is an elastic "duckbill" valve which opens under slight pressure to allow air flow into the bellows 12", and functions in a manner similar to that of the check valve 94 discussed above.

The pressure relief valve 106 is a controlled leak valve which has a trigger point pressure differential which allows egress of air only when the pressure of the air in the bellows 12" is above a set value. Additionally, means for closing the pressure relief valve 106 when the bellows second section second end 24' engages the backing plate 28 are provided. In the pneumatic resiliency unit 100, the means for closing the pressure relief valve 106 are provided by configuring the pressure relief valve 106 to forcibly engage the backing plate 28 when the bellows second section second end 24' engages the backing plate 28. Such forcible engagement causes the pressure relief valve 106 to remain closed independent of the pressure in the bellows 12".

The pressure relief valve 106 provides a time-dependent initial response for the bellows 12". If a load is applied gradually to the support surface 26, the bellows first section 14 and bellows second section 20' can accommodate displacement of the support surface 26 in the manner discussed above for the embodiment shown in FIG. 2. The trigger point of the pressure relief valve 106 is set sufficiently high that the pressure required to cause the bellows sections (14 and 20') to deform is not sufficient to activate the pressure relief valve 106. However, if a large load is suddenly applied to the support surface 26, the support surface 26 is displaced faster than the bellows second section 20' can deform to accommodate such displacement. As a result, the volume $V_b$ of the bellows 12" is decreased, increasing the pressure in the bellows 12" sufficiently to trigger the pressure relief valve 106. The pressure relief valve 106 allows egress of air to reduce such pressure, thus effectively softening the response exhibited by the bellows 12" under such conditions.

When the bellows second section 20' expands sufficiently that the bellows second section second end 24' engages the backing plate 28, the pressure relief valve 106 forcibly engages the backing plate 28, thereby closing the pressure relief valve 106 and preventing further egress of air from the bellows 12". The closure of the pressure relief valve 106 allows increased pressure to be maintained in the bellows 12" such that the stiff response when the bellows second section second end 24' engages the backing plate 28 is not impaired.

Figure 12:
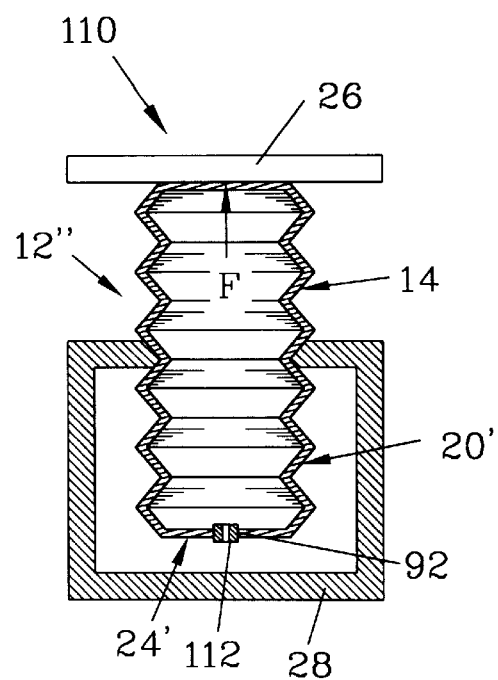
FIG. 12 is a schematic representation of another embodiment of a variable response pneumatic resiliency unit of the present invention which employs a controlled leak orifice for air intake and out-leak. The surface of the backing plate is configured to seal the orifice when the bellows second section second end engages the backing plate.

FIG. 12 illustrates another embodiment which forms an open system, a variable response pneumatic resiliency unit 110. In this embodiment, the opening 92 is fitted with an outlet orifice 112. The outlet orifice 112 restricts the flow of air through the opening 92 to control ingress and egress of air. The outlet orifice 112 again provides a time-dependent response to loading of the support surface 26.

A load applied gradually to the support surface 26 causes gradual deformation of the bellows first section 14 and experiences a reduced reaction force F, since air egress through the outlet orifice 112 reduces the amount of deformation of the bellows second section 20'. If the load were applied sufficiently gradually, egress of air through the outlet orifice 112 would be sufficient to compensate for the deformation of the bellows first section 14, and there would be no expansion of the bellows second section 20'. For this reason, the size of the outlet orifice 112 is preferably selected to restrict air flow such that under the intended usage conditions, such extreme gradual loading will not be experienced. For most uses, an outlet orifice which allows the pressure to equilibrate in between 0.5 and 5 seconds is felt to be practical.

When a load is applied to the support surface 26 quickly, the limited air flow through the outlet orifice 112 prevents a significant volume of air from escaping, thus the effect of the outlet orifice 112 in reducing pressure is significantly diminished. If the load is applied sufficiently quickly, the effect of the outlet orifice 112 is negligible.

The outlet orifice 112 is configured to sealably engage the backing plate 28 when the bellows second section 20' expands sufficiently that the bellows second section second end 24' engages the backing plate 28. Such sealable engagement prevents further egress of air from the bellows 12" to preserve the stiff response of the bellows 12" when the bellows second section second end 24' engages the backing plate 28.

While the above examples of open systems employ valves or orifices to passively control ingress and egress of air in the system, it is also possible to actively control the ingress and egress of air. Such active control allows for further variation in the response to loading of the support surface 26.

Figure 13:
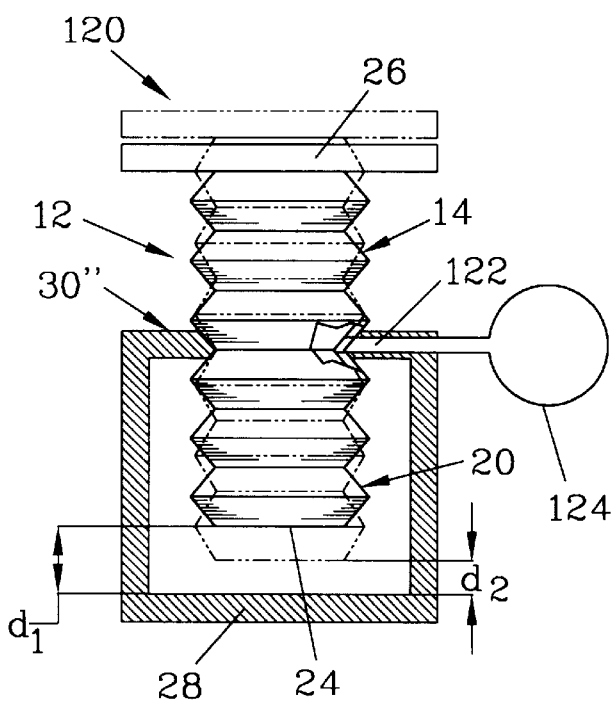
FIG. 13 illustrates another integrated pneumatic support of the present invention, where the intermediate support platform is configured to provide an air passage which communicates with the bellows. In this embodiment, a means of controlling air pressure is provided which communicates with the bellows via the air passage to allow further adjustment in the response of the bellows to loads.

FIG. 13 illustrates a variable response pneumatic resiliency unit 120 which allows active control of ingress and egress of air in the bellows 12. The pneumatic resiliency unit 120 is structurally similar to the pneumatic resiliency unit 10 shown in FIGS. 1 and 2, but differs in the construction of the intermediate support platform 30". In the pneumatic resiliency unit 120, the intermediate support platform 30" is configured to provide an air passage 122 which communicates with the bellows first section 14 and the bellows second section 20. The air passage 122 also communicates with a means for controlling air pressure 124. The means for controlling air pressure 124 may be a pump, expansion chamber, auxiliary bellows, or other air pressurizing device or system such as is known in the art.

Adjustment of the pressure in the bellows 12 changes the response of the bellows 12 to loading of the support surface 26. At an initial pressure, the bellows second section second end 24 is spaced apart from the backing plate 28 by a distance $d_1$, and the response of the pneumatic resiliency unit 120 is similar to that of the pneumatic resiliency unit 10 shown in FIG. 2. However, if the pressure in the bellows 12 is increased, the bellows 12 expands to the position indicated in phantom. This expansion of the bellows 12 increases the length of the bellows second section 20, thus the bellows second section second end 24 becomes spaced apart from the backing plate 28 by a decreased distance $d_2$. As discussed above, this decreases the amount of displacement of the support surface 26 which is required to cause transition between the initial soft response and the subsequent stiff response of the bellows 12. Additionally, the increased pressure alters the stiffness of the stiff response, since the mass of air in the bellows 12 being compressed is greater. It should be noted that the increased pressure also increases the length of the bellows first section 14, such that the unloaded position of the support surface 26 is raised.

Figure 14:
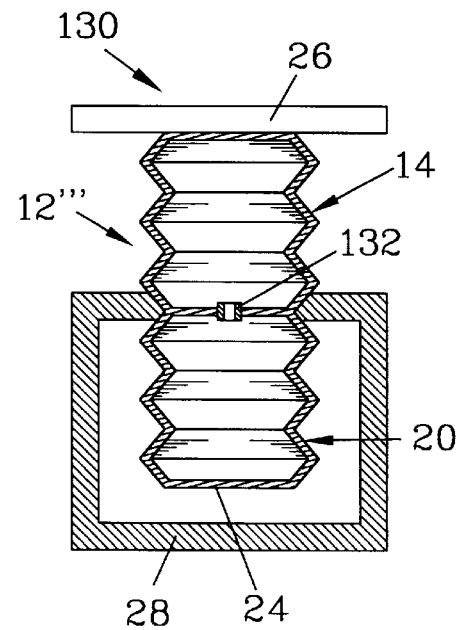
FIG. 14 is a schematic representation of another embodiment of a variable response pneumatic resiliency unit of the present invention which employs a throttling orifice between the bellows sections to alter its response to suddenly applied loads.

FIG. 14 illustrates a variable response pneumatic resiliency unit 130 which is again similar to the pneumatic resiliency unit 10 shown in FIGS. 1 and 2. The pneumatic resiliency unit 130 differs in that it employs a bellows 12''' which has a throttling orifice 132 between the bellows first section 14 and the bellows second section 20. The throttling orifice 132 limits air flow between the bellows first section 14 and the bellows second section 20 to provide a time-dependent response to loads applied to the support surface 26, without requiring the bellows 12''' to form an open system.

If a load is applied to the support surface 26 gradually, the throttling orifice 132 can accommodate air flow from the bellows first section 14 as it is compressed to the bellows second section 20, which expands. When the compression of the bellows first section 14 is sufficiently gradual that the throttling orifice 132 can accommodate such air flow, the response of the bellows 12''' is similar to that of the bellows 12 shown in FIG. 2.

If a load is applied rapidly to the support surface 26, the throttling orifice 132 limits air flow from the bellows first section 14 as it is compressed, such that the pressure in the bellows first section 14 increases. This increase in pressure provides a relatively stiff response to loading and displacement of the support surface 26. As air continues to flow through the throttling orifice 132, the pressure between the bellows first section 14 and the bellows second section 20 equilibrates, causing the bellows second section 20 to expand until the bellows second section second end 24 engages the backing plate 28. Thus, in this embodiment, the stiffness of the initial response to displacement of the support surface 26 is dependent on the speed of such displacement.

Figure 15:
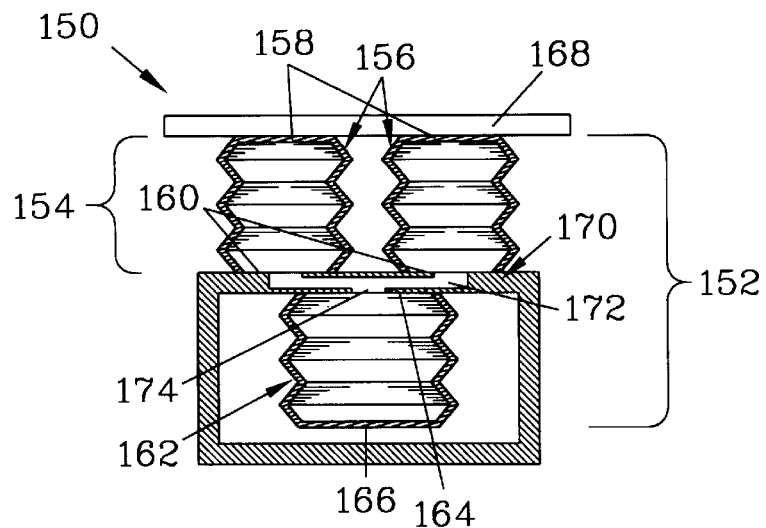
FIG. 15 is a schematic representation of another embodiment of a variable response pneumatic resiliency unit of the present invention which employs a bellows first section which has multiple lobes and which has an inter-lobe manifold which is embedded in the intermediate support platform.

FIG. 15 illustrates a variable response pneumatic resiliency unit 150 which provides a response similar to that of the pneumatic resiliency unit 130 shown in FIG. 14, but which differs in structure. The pneumatic resiliency unit 150 employs a bellows 152 which has a bellows first section 154 having multiple first section lobes 156. Each first section lobe 156 terminates in a first section lobe first end 158 and a first section lobe second end 160. The bellows 152 also has a bellows second section 162 which terminates in a bellows second section first end 164 and a bellows second section second end 166.

A support surface 168 engages the first section lobe first ends 158. An intermediate support platform 170 is provided, which is attached to the first section lobe second ends 160 and to the bellows second section first end 164. The intermediate support platform 170 is configured to provide an inter-lobe manifold 172 which, in the pneumatic resiliency unit 150, serves two functions. The inter-lobe manifold 172 serves to equilibrate pressure between the first section lobes 156, and also provides a throttling orifice 174 between the bellows first section 154 and the bellows second section 162. It should be noted that in this embodiment, the bellows first section 154 and the bellows second section 162 have differing volumes per unit length, and thus the transition between the initial response and subsequent response of the bellows 152 is similar to that of the bellows 12' shown in FIG. 7.

To provide a support surface of a desired size, multiple pneumatic resiliency units of the various types discussed above can be combined to form a compliant variable response pneumatic support surface.

Figure 16:
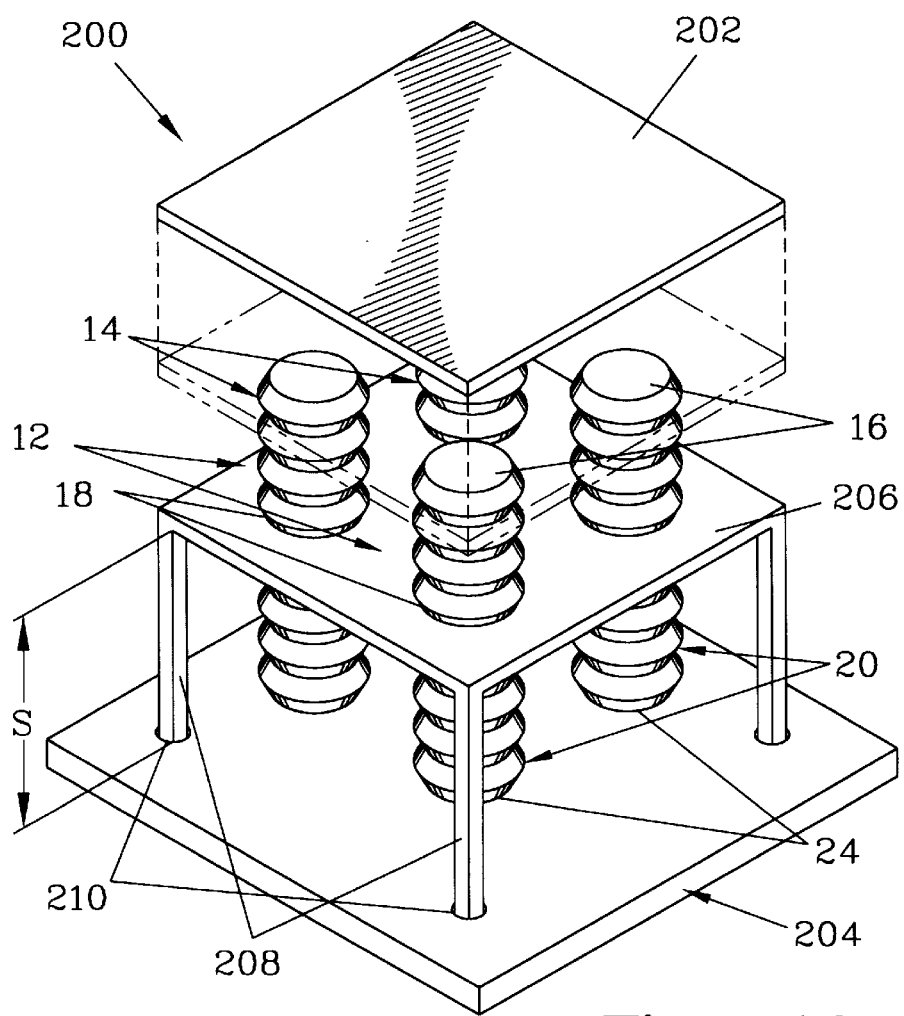
FIG. 16 illustrates another embodiment of the present invention, a modular pneumatic support which employs multiple bellows such as are shown in FIGS. 1 and 2.

FIG. 16 is a partially exploded view which illustrates one embodiment of the present invention, a modular pneumatic support surface 200 which employs multiple bellows 12 such as is discussed above. While any of the types of pneumatic resiliency units discussed above may be employed, the pneumatic support surface 200 illustrated is formed by the combination of multiple pneumatic resiliency units 10 such as is shown in FIGS. 1 and 2. The employment of multiple bellows 12 allows the pneumatic support surface 200 to more readily conform to the shape of the user's body. When support is desired over a larger area, multiple pneumatic support surfaces 200 can be combined. Alternatively, the pneumatic support surface 200 could be constructed with a greater number of bellows 12.

The bellows first section first ends 16 of each of the bellows 12 engage an extended support surface 202. The extended support surface 202 is preferably fabricated from a semi-compliant material which effectively integrates the deformation between the bellows 12 when a load is applied to the extended support surface 202, preventing large differences in height between the bellows first section first ends 16 of adjacent bellows 12. The degree of compliancy of the extended support surface 202 will, in part, be dependent on the area of the bellows first section first ends 16 and on the spacing between the bellows 12. It is preferred for the extended support surface 202 to be fabricated from a breathable material.

An extended backing plate 204 is spaced apart from the extended support surface 202, and serves the same function as the backing plate 28 shown in FIGS. 1 and 2. The bellows second section second end 24 of each of the bellows 12 is engagable with the backing plate 204.

An extended intermediate support platform 206 is maintained at a separation S from the extended backing plate 204. In the pneumatic support surface 200, the extended intermediate support platform 206 has support legs 208 which engage leg recesses 210 in the extended backing plate 204.

The extended intermediate support platform 206 is attached to the bellows first section second end 18 and to the bellows second section first end 22 (not visible in FIG. 16) of each of the bellows 12.

To prevent bending of the bellows 12, it is preferred that the height-to-diameter ratio of the bellows first sections 14 be not greater than about 3:1.

Figure 17:
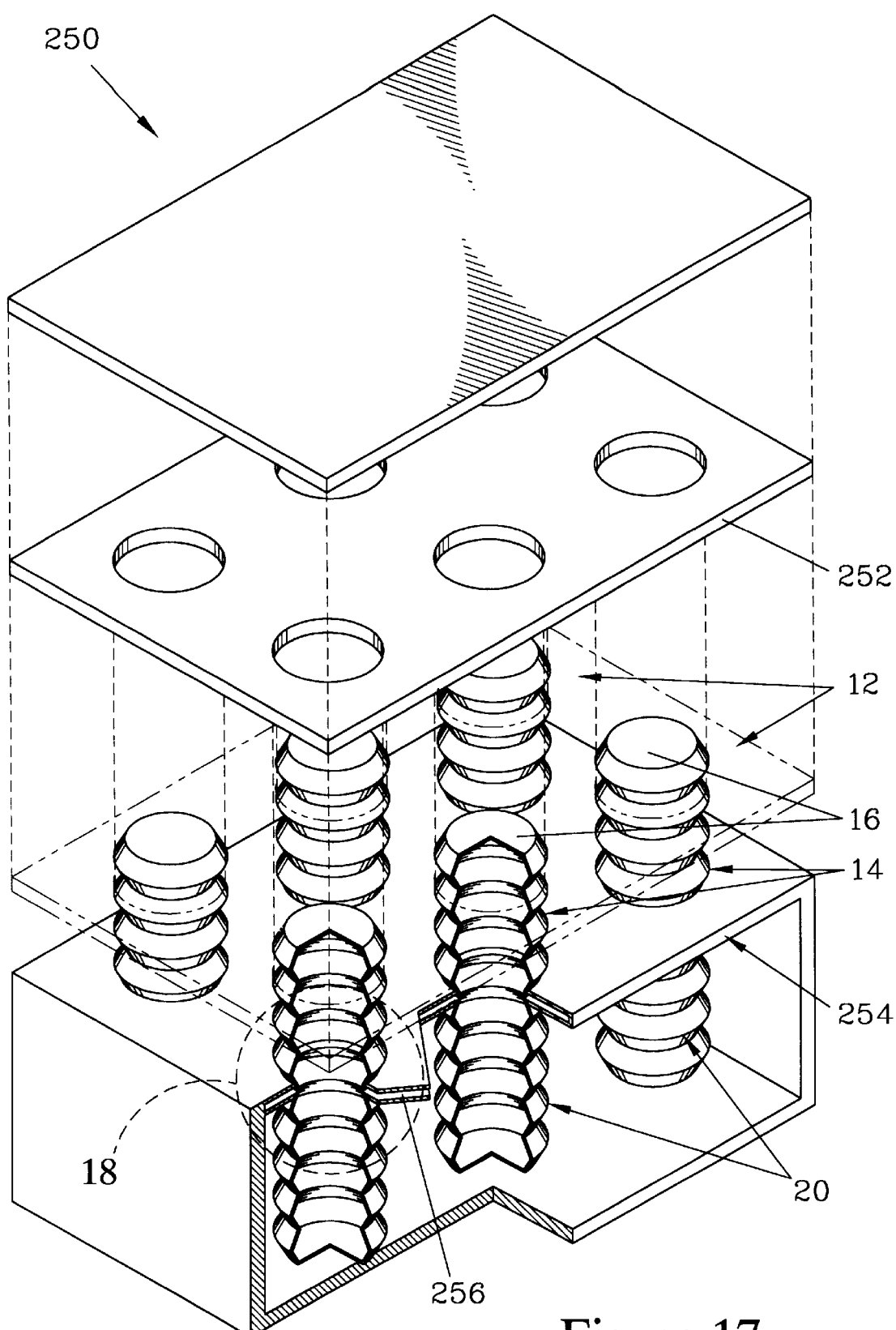
FIG. 17 illustrates another embodiment of the present invention, an integrated pneumatic support surface which employs multiple bellows which are maintained in a parallel relationship to each other by a semi-compliant spacer net which engages the bellows first section first ends of the bellows near the bellows first section first ends. This embodiment also employs an extended intermediate support platform which contains an inter-bellows manifold for distributing the air between the bellows.

FIG. 17 illustrates an integrated pneumatic support surface 250 which also employs multiple bellows 12. The pneumatic support surface 250 differs from the pneumatic support surface 200 discussed above in part in that a semi-compliant spacer net 252 is provided. The spacer net 252 engages the bellows first sections 14 in the vicinity of the bellows first section first ends 16. The spacer net 252 limits motion of the bellows first section first ends 16 with respect to each other, and thus serves to maintain the bellows first sections 14 in parallel relationship with respect to each other.

The integrated pneumatic support surface 250 also differs in that it employs an extended intermediate support platform 254 which is configured to provide an inter-bellows manifold 256. The inter-bellows manifold 256 communicates with the bellows first section 14 and the bellows second section 20 of each of the bellows 12 in a manner similar to that of the air passage 122 shown in FIG. 13. The inter-bellows manifold 256 provides means for equilibrating air pressure between the bellows 12. Although not shown, a means for controlling air pressure could be employed, in a manner similar to the means for controlling air pressure 124 shown in FIG. 13.

Figure 18:
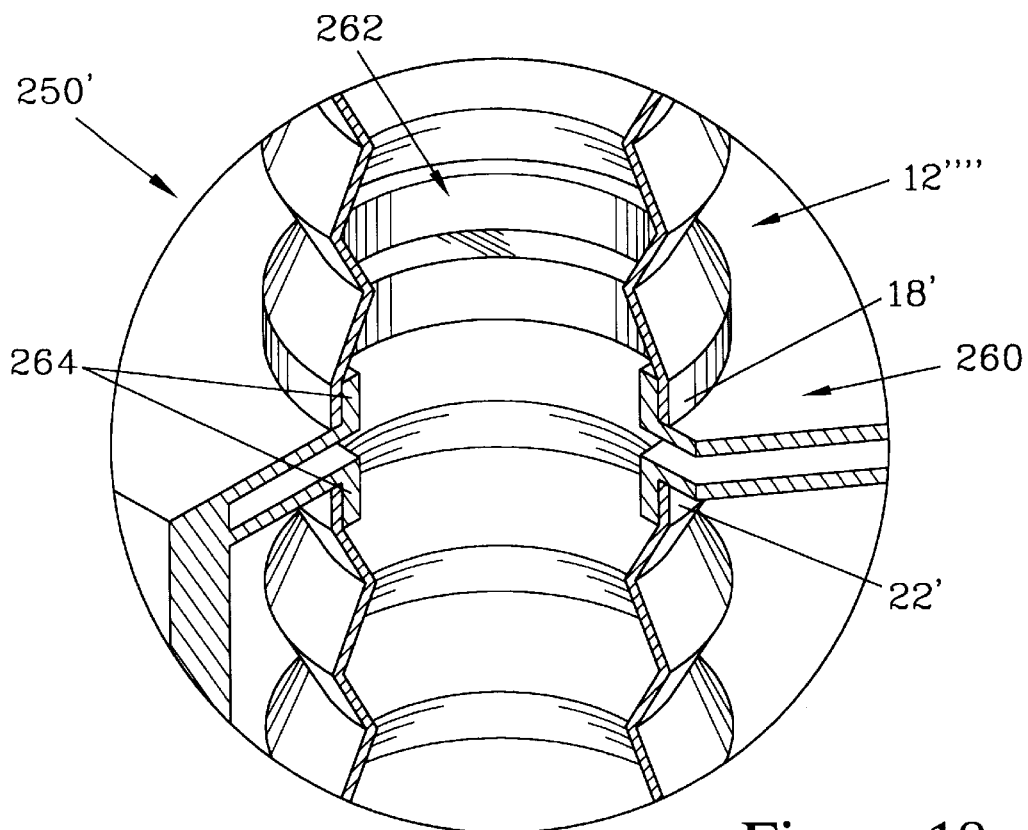
FIG. 18 is a detail view which corresponds to the area 18 shown in FIG. 17, showing an alternative integrated pneumatic support surface. This embodiment employs an extended intermediate support platform which is provided with projecting rims to which the bellows sections of the multiple bellows are mounted.

FIG. 18 is a detail view which corresponds to the area 18 shown in FIG. 17, showing a portion of an alternative integrated pneumatic support surface 250'. FIG. 18 illustrates a bellows 12"" which is adapted to be readily incorporated into the pneumatic support surface 250'. The pneumatic support surface 250' employs an extended intermediate support platform 260 which has bellows apertures 262 (only one of which is shown), each having projecting rims 264. The bellows first section second end 18' and the bellows second section first end 22' of the bellows 12"" are configured to engage the projecting rims 264. The bellows first section second end 18' and the bellows second section first end 22' are attached to the projecting rims 264 by adhesive, heat sealing, or other methods known in the art.

Figure 19:
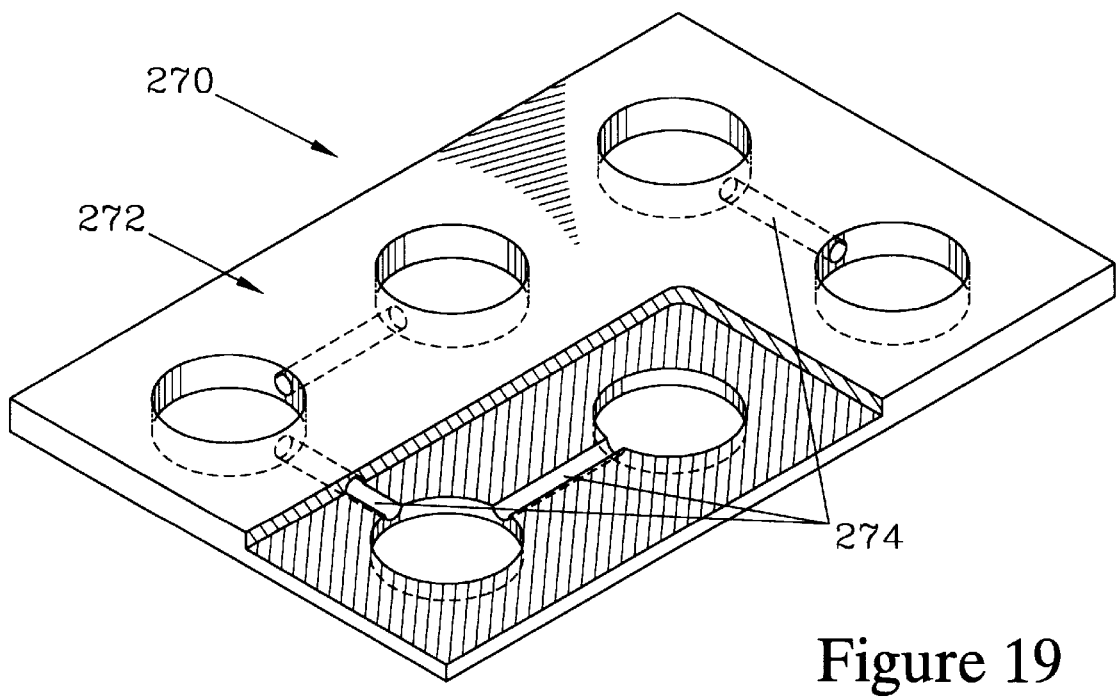
FIG. 19 illustrates an alternative extended intermediate support platform which may be employed in the integrated pneumatic support surface shown in FIG. 17. The extended intermediate support platform contains an inter-bellows manifold which employs air passages to provide selective distribution of air between the multiple bellows.

FIG. 19 illustrates an extended intermediate support platform 270 which may be employed in the integrated pneumatic support surface 250 discussed above in place of the extended intermediate support platform 254. The extended intermediate support platform 270 is again configured to provide an inter-bellows manifold 272. However, the inter-bellows manifold 272 is made up of discrete air passages 274, which selectively connect between the bellows 12 to provide selective distribution of air between the bellows 12. Selectively distributing the air allows further adjustment of the response of the integrated pneumatic support surface 250.

While the novel features of the present invention have been described in terms of particular embodiments and preferred applications, it should be appreciated by one skilled in the art that substitution of materials and modification of details obviously can be made without departing from the spirit of the invention.

What we claim is:

1. A variable response pneumatic resiliency body support system, comprising:

a bellows having, a bellows first section terminating in a bellows first section first end and a bellows first section second end, and a bellows second section terminating in a bellows second section first end and a bellows second section second end, a support surface for resiliently supporting a load applied thereto, said support surface being engaged with said bellows first section first end such that said bellows first section compresses under an applied load;

a backing plate spaced apart from said support surface and positioned such that compression of said bellows first section by a load applied to said support surface moves said support surface towards said backing plate; and an intermediate support platform positioned at a separation S from said backing plate, said intermediate support platform being coupled to said bellows first section second end and to said bellows second section first end so as to maintain said bellows second section first end at a fixed position to prevent compression of said bellows second section.

2. The variable response pneumatic resiliency body support system of claim 1 wherein said separation S is sufficient to assure that said bellows second section second end is spaced apart from said backing plate by a distance d when said support surface is load free.

3. The variable response pneumatic resiliency body support system of claim 2 further comprising:

means for adjusting said separation S.

4. The variable response pneumatic resiliency body support system of claim 2 wherein said bellows first section and said bellows second section have differing volumes per unit length.

5. The variable response pneumatic resiliency body support system of claim 2 wherein said bellows forms a closed system.

6. The variable response pneumatic resiliency body support system of claim 2 wherein said bellows forms an open system and further comprises:

means for controlling ingress and egress of air to and from said bellows.

7. The variable response pneumatic resiliency body support system of claim 6 wherein said means for controlling ingress and egress of air further comprises:

a valve residing in said bellows second section second end.

8. The variable response pneumatic resiliency body support system of claim 7 wherein said valve is a one-way valve allowing ingress of air into said bellows.

9. The variable response pneumatic resiliency body support system of claim 8 further comprising:

a supplementary pressure relief valve residing in said bellows second section second end which allows egress of air from said bellows when the pressure in said bellows is above a preset value; and means for closing said supplementary pressure relief valve when said bellows second section second end engages said backing plate.

10. The variable response pneumatic resiliency body support system of claim 6 wherein said means for controlling ingress and egress of air further comprises:

an outlet orifice residing in said bellows second section second end and configured to sealably engage said backing plate when said bellows second section second end is in contact with said backing plate.

11. The variable response pneumatic resiliency body support system of claim 6 further comprising:

an air passage which communicates with said bellows; and means for adjusting air pressure, said means for adjusting air pressure being connected to said air passage.

12. The variable response pneumatic resiliency body support system of claim 1 wherein said backing plate is provided with a resilient surface for engagement with said bellows second section second end.

13. The variable response pneumatic resiliency body support system of claim 2 further comprising:

means for restricting the flow of air between said bellows first section and said bellows second section.

14. The variable response pneumatic resiliency body support system of claim 13 wherein said means for restricting the flow of air between said bellows first section and said bellows second section further comprises:

a throttling orifice communicating between said bellows first section and said bellows second section.

15. The variable response pneumatic resiliency body support system of claim 2 wherein at least one of said bellows first section and said bellows second section has multiple lobes, the pneumatic resiliency unit further comprising:

means for equilibrating the pressure between said multiple lobes.

16. The variable response pneumatic resiliency body support system of claim 15 wherein said means for equilibrating the pressure between said multiple lobes further comprises:

a lobe manifold connecting said lobes and residing in said intermediate support platform.

17. The variable response pneumatic resiliency body support system of claim 16 wherein said lobe manifold provides means for restricting the flow of air between said bellows first section and said bellows second section.

18. A compliant variable response pneumatic body support surface comprising:

at least two bellows, each of said at least two bellows having,
   a bellows first section terminating in a bellows first section first end and a bellows first section second end, and
   a bellows second section terminating in a bellows second section first end and a bellows second section second end;

an extended support surface for resiliently supporting a load applied thereto, said extended support surface being engaged with each of said bellows first section first ends such that at least one of said bellows first sections compresses under an applied load;

an extended backing plate spaced apart from said extended support surface and positioned such that compression of at least one of said bellows first sections by a load applied to said extended support surface moves at least a portion of said extended support surface towards said extended backing plate; and an extended intermediate support platform positioned at a separation S from said extended backing plate, said extended intermediate support platform being coupled to each of said bellows first section second ends and to each of said bellows second section first ends so as to maintain each of said bellows second section first ends at fixed positions to prevent compression of said bellows second sections.

19. The compliant variable response pneumatic body support surface of claim 18 further comprising:

means for equalizing pressure between at least two of said bellows.

20. The compliant variable response pneumatic body support surface of claim 19 wherein said means for equalizing pressure between at least two of said bellows further comprises:

a bellows manifold residing in said extended intermediate support platform.

21. The compliant variable response pneumatic body support surface of claim 18 further comprising:

a support net which engages each of said bellows first section first ends, said support net having sufficient rigidity to maintain each of said at least two bellows in a parallel relationship with respect to each other.

22. The compliant variable response pneumatic body support surface of claim 18 wherein said at least two bellows form a closed system.

23. The compliant variable response pneumatic body support surface of claim 18 wherein said at least two bellows form an open system.

* * * * *